Jan. 25, 1927.
W. C. STARKEY
SPRING CLUTCH CONSTRUCTION
Filed March 22, 1926
1,615,804
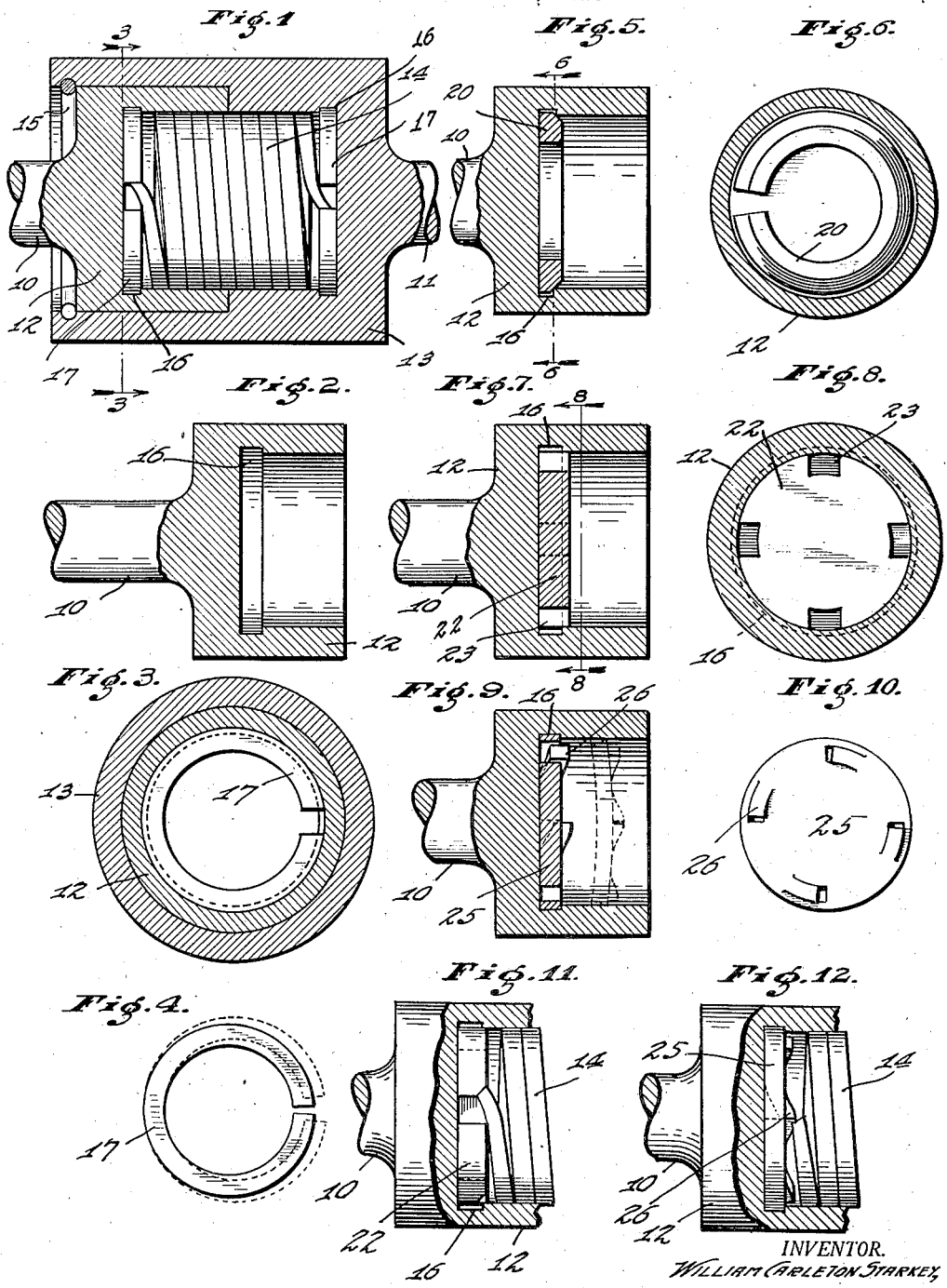
INVENTOR.
WILLIAM CARLETON STARKEY,
BY
ATTORNEY.

Patented Jan. 25, 1927.

1,615,804

UNITED STATES PATENT OFFICE.

WILLIAM CARLETON STARKEY, OF INDIANAPOLIS, INDIANA, ASSIGNOR TO L. G. S. DEVICES CORPORATION, OF INDIANAPOLIS, INDIANA, A CORPORATION OF INDIANA.

SPRING CLUTCH CONSTRUCTION.

Application filed March 22, 1926. Serial No. 96,374.

This invention is concerned with a clutch of the type in which two relatively rotatable co-axial members are provided with alined circular recesses for the reception of a coil spring which engages the recess walls. Such a clutch is shown in United States Letters Patent No. 1,006,500 issued to Erick B. Peterson on October 24, 1911. In such a clutch the spring operates to clutch the two members together when they tend to rotate relatively in a direction to unwind the spring; and when the two members rotate relatively in the opposite direction, a tendency to wind the spring is produced and the spring recedes slightly from the recess walls and permits free rotation in that direction.

It is the object of my invention to cheapen and simplify the manufacture of such a clutch. A further object of my invention is to make the clutch more positive in operation by insuring that all the turns of the coil spring will operate to clutch the two relatively rotatable members together when they tend to rotate in a direction to unwind the spring.

I accomplish the above objects by providing near the bottom of each spring-receiving recess an annular groove slightly larger in diameter than the recess, and before placing the spring in the recess, I provide each clutch member with means which will prevent any spring-turn from entering such groove. To insure that all the turns of the coil spring cooperate in the clutching function, I construct each groove-closing means so as to provide one or more abutments adapted to be engaged by the adjacent spring-end, and I bend each end-turn of the spring axially outward so that the spring-end may yield sufficiently to permit relative rotation of the spring and clutch member in a direction to wind the spring.

The accompanying drawing illustrates my invention: Fig. 1 is a longitudinal central section through a clutch provided with one form of groove-closing means; Fig. 2 is a longitudinal central section through one of the clutch members with the spring removed; Fig. 3 is a cross-section on the line 3—3 of Fig. 1; Fig. 4 illustrates the split spring ring which forms the groove-closing means shown in Fig. 1; Fig. 5 is a longitudinal section through a clutch member provided with a modified form of split spring ring; Fig. 6 is a transverse section on the line 6—6 of Fig. 5; Fig. 7 is a longitudinal section of a clutch member provided with a different form of groove-closing means; Fig. 8 is a section on the line 8—8 of Fig. 7; Fig. 9 is a longitudinal section of a clutch member provided with a still different form of groove-closing means; Fig. 10 is an elevation of the groove-closing means shown in section in Fig. 9; and Figs. 11 and 12 are fragmental longitudinal sections illustrating a modified form of coil spring.

I have illustrated my clutch as applied to two co-axial shafts 10 and 11, but the use of my clutch is not limited to this specific situation, as it may be used to interconnect any two relatively rotatable, co-axial parts. The shaft 10 is provided at its end with a clutch member 12, and the shaft 11 is provided with a clutch member 13. The two clutch members 12 and 13 are recessed for the reception of a coil spring 14, which is preferably of such a diameter as to bear lightly against the cylindrical walls of the recesses, although it may be of less diameter than the recesses.

Some convenient means is employed for preventing axial separation of the two clutch members 12 and 13. To this end, I have illustrated the clutch member 13 as being counter-bored to receive the clutch member 12 and as extending over and beyond such clutch member. In the inner surface of the clutch member 13 I provide an annular groove for the reception of a spring ring 15, which, when in place bears against the back of the clutch member 12 and holds the two clutch members together.

In the manufacture of a clutch of the type herein described, it is desirable that the spring-engaging surface of the clutch members be ground in order to provide a suitable bearing for the spring. Such grinding has heretofore been an expensive and troublesome operation because of the difficulty experienced in obtaining the necessary sharp corner at the bottom of the recess. It is possible to overcome this difficulty by undercutting the recess wall to form a groove 16 as shown in Fig. 2 of the drawing, but the presence of this groove in the completed clutch is a disadvantage in that the end turn of the coil spring drops into the groove and tends to become wedged therein.

To eliminate these difficulties I provide each clutch member with the annular groove 16 to provide clearance for the grinding wheel which is used to finish the recess walls, and after the grinding is finished I mount in each clutch member means for preventing any of the spring turns from entering the groove 16. In Figs. 1 and 3, this groove-closing means is shown as consisting of a split spring ring 17, which may be of rectangular stock and is formed with its ends spaced apart in order that the ring may be contracted from the dotted line to the full-line condition shown in Fig. 4. When so contracted, it may be inserted into the recess in the clutch member and permitted to expand to fill the groove 16. When in place in the groove the ends of the ring 17 are spaced apart, as is evident from Fig. 3 and the dotted lines of Fig. 4. The stock from which the ring 17 is made is of sufficient width so that the internal diameter of the ring when it is in place will be materially less than the diameter of the recess in order that the ring may form a shoulder against which the adjacent end of the coil spring may abut.

Preferably I bend each end of the spring 14 axially outward, as illustrated in Fig. 1, so that when the two clutch members 12 and 13 tend to rotate relatively in a direction to unwind the spring each spring end will project axially outward into the gap between the ends of the adjacent ring 17 and will be engaged by one of such ring-ends. This engagement between each ring and the adjacent spring-end prevents relative rotation of the spring 14 and the clutch members, and insures that the spring will be unwound from its ends to bring all of its turns into firm engagement with the recess walls of the clutch members.

In order to illustrate the construction more clearly the outward bending of the ends of the spring 14 has been exaggerated. This outward bending need only be sufficient to permit the spring-ends to move axially inward to permit free relative rotation of the two clutch members in a direction tending to wind the spring.

The spring ends and their associated spring rings 17 form what are in effect ratchet devices which operate to prevent relative rotation of the spring 14 and the clutch members 12 and 13 when the two clutch members tend to rotate in a direction to unwind the spring. In accomplishing this result, the spring-ends transmit only a very small proportion of the total torque transmitted between the two clutch members as practically the entire torque is transmitted by reason of the frictional engagement between the cylindrical surfaces of the spring and the recesses. The slight force transmitted directly between the spring 14 and the rings 17 serves merely to insure that the spring 14 will unwind from its ends to bring all its turns into firm engagement with the walls of the associated recesses when the two clutch members tend to rotate relatively in a direction to unwind the spring. Another means for accomplishing this same result is shown in the co-pending application of Albert Lieber, Serial No. 71,281, filed November 25, 1925.

The ring 17 shown in Figs. 1, 3, and 4 should be somewhat less in thickness than the width of the groove 16 which it occupies in order to insure that it will be free to expand into such groove. Its thickness, however, should closely approximate the width of such groove in order that it may have no axial movement when in place in the clutch member. This precise regulation of the thickness of the ring 17 is apt to be expensive, and I therefore prefer to use the ring 20 shown in Figs. 5 and 6, which ring eliminates the necessity for careful control of either the thickness of the ring or the width of the groove 16. The ring 20 is somewhat thicker than the width of the groove 16 and one outer edge of the ring is beveled sufficiently to make the circumferential face of the ring slightly less in width than the width of the groove 16. When the ring 20 expands into the groove 16 its beveled face engages the bottom edge of the ground cylindrical surface of the recess in the clutch member as is clear from Fig. 5. For this type of ring to be effective, its expansion should be limited by the engagement of the beveled face with the bottom edge of the cylindrical recess rather than by the engagement of the circumferential ring surface with the bottom of the groove 16. The ring 20 has an advantage over the ring 17 in that the outward force it exerts against the clutch member 12 serves to hold it in a definite axial position relative to such clutch member, and this result is accomplished without the necessity for closely relating the thickness of the ring 20 and the width of the groove 16.

In Figs. 7 and 8, I have illustrated a groove-closing means which is different from the two forms of split spring ring above described and is as effective. This groove-closing means consists of a disk 22 which has a thickness greater than the width of the groove 16. The disk 22 is of such a diameter that it is a press fit in the recess in the clutch member 12 and hence when in place is rigid with such clutch member. One or more notches 23 may be provided in the periphery of the disk 22 in position to be entered by the out-bent adjacent spring-end. The sides of the notches 23 serve the same purpose, in this respect, as do the ends of the rings 17 and 20 in that they prevent relative rotation of the spring and the clutch members in a direction tending to unwind the spring.

In Figs. 9 and 10 I have illustrated a still different type of groove closing means. This consists of a disk 25 provided with a circumferential series of teeth 26 which may conveniently be formed by striking up portions of the disk 25 as indicated in the drawing. The disk 25, when formed, is dished as indicated in the dotted lines in Fig. 9. This dishing of the disk 25 reduces its diameter so that it can be placed at the bottom of the recess in the clutch member and then flattened and expanded to fill the groove 16. The teeth 26 on the disk 25 serve the same purpose as do the sides of the notches 23 in the disk 22. The disks 22 and 25 have an advantage over the split spring rings 17 and 20 particularly noticeable when the spring 14 has a normal external diameter less than the diameter of the recesses in the clutch members. When such a spring is used, the plurality of spring-engaging abutments provided by the disks 22 and 25 lessen the distance through which the two clutch members must be rotated in a direction to unwind the spring before they are clutched together.

By the use of the groove-closing means described I am enabled to grind the recess in each of the clutch members so that such recess will have the same diameter throughout its working length, and I avoid the inconvenience attendant upon the use of a clutch member having an annular groove in which the spring-end may become wedged.

In the device which I have shown and described each of the clutch members is provided with a recess for the reception of the spring 14 so that operative connection of the spring with each clutch member is secured by reason of the frictional engagement of the spring with the walls of the recess in such clutch member. While this manner of interconnecting the spring with the clutch member is preferable, it is only necessary that the spring be so connected to one of such clutch members as its mode of operative connection to the other clutch member may be anything desired.

The springs in clutches of the general type herein described may be so proportioned as to transmit a predetermined maximum torque in the direction in which they operate to clutch the two shafts 10 and 11 together. A clutch equipped with such a spring when subjected to a torque greater than the predetermined maximum will slip and permit relative rotation of the two parts which it connects. It will be obvious that in the type of clutch illustrated in Figs. 1 to 6 inclusive such slippage will entail rotation of one of the rings 16 or 20 in its associated clutch member. By varying the normal diameter of the groove-closing rings, and thus varying the force with which they bear against their associated clutch members, the maximum torque which a given clutch can transmit can be controlled to an extent. When this maximum torque is exceeded, one of the groove-closing rings rotates with the spring relative to the clutch member in which it is located. The groove-closing means illustrated in Figs. 7 to 10 inclusive are not adapted to rotate relative to their associated clutch members, as they are pressed into such clutch members and are practically rigid therewith. If it is desired to use such groove-closing means with a spring which may slip when subjected to a torque greater than a predetermined torque, the spring-end, or the abutment which it engages, or both, may be beveled as indicated in Figs. 11 and 12 in order that the force transmitted between the spring-end and its associated abutment will have a component axially of the clutch. This component of force, in the normal operation of the clutch, is exceeded by the axial resiliency of the last spring-turn, and the spring-end therefore remains in engagement with its abutment; but when a maximum predetermined torque is exceeded, this axial component of force overcomes the axial resilience of the last spring turn and forces the spring-end inward to permit the spring and clutch member to rotate relatively in the direction tending to unwind the spring.

I claim as my invention:

1. In combination, two relatively rotatable coaxial members having alined circular recesses, a coil spring located in said recesses and having contact with each of said members so that when they tend to rotate relatively in a direction to unwind said spring it will expand into firm frictional engagement with the walls of its associated recesses to prevent such relative rotation, each of said clutch members being provided with an annular groove in the cylindrical wall of its recess near the bottom thereof, and means for preventing any of the turns of said spring from entering said grooves.

2. In combination, two relatively rotatable coaxial members having alined circular recesses, a coil spring located in said recesses and having contact with each of said members so that when they tend to rotate relatively in a direction to unwind said spring it will expand into firm frictional engagement with the walls of its associated recesses to prevent such relative rotation, each of said clutch members being provided with an annular groove in the cylindrical wall of its recess near the bottom thereof, and a split spring ring located in said groove to prevent a spring turn from entering it.

3. In combination, two relatively rotatable members, one of said members having an axial cylindrical recess, a coil spring located in said recess and having an operative connection with the other of said rotatable members, said spring having contact with said recessed member so that when said members tend to rotate in a direction to unwind said spring it will expand into firm frictional engagement with the wall of such recess to prevent such rotation, said recessed clutch member being provided with an annular groove in the cylindrical wall of its recess near the bottom thereof, and means for preventing any of the turns of said spring from entering said groove.

4. In combination, two relatively rotatable members, one of said members having an axial cylindrical recess, a coil spring located in said recess and having an operative connection with the other of said rotatable members, said spring having contact with said recessed member so that when said members tend to rotate in a direction to unwind said spring it will expand into firm frictional engagement with the wall of such recess to prevent such rotation, said recessed clutch member being provided with an annular groove in the cylindrical wall of its recess near the bottom thereof, and a split spring ring located in said groove to prevent a spring turn from entering it.

5. In combination, two relatively rotatable members, one of said members having an axial cylindrical recess, a coil spring located in said recess and having an operative connection with the other of said rotatable members, said spring having contact with said recessed member so that when said members tend to rotate in a direction to unwind said spring it will expand into firm frictional engagement with the wall of such recess to prevent such rotation, said recessed clutch member being provided with an annular groove in the cylindrical wall of its recess near the bottom thereof, and a split spring ring located in said groove to prevent a spring turn from entering it, said ring extending radially inward beyond the recess wall to form an abutment for the adjacent end of said spring.

6. The combination set forth in claim 5 with the addition that the ends of said split spring ring are spaced apart when said ring is in place, the end of said coil spring being bent axially outward so as to be capable of entering the space between the ends of said ring.

7. In combination, two relatively rotatable members, one of said members having an axial cylindrical recess, a coil spring located in said recess and having an operative connection with the other of said rotatable members, said spring having contact with said recessed member so that when said members tend to rotate in a direction to unwind said spring it will expand into firm frictional engagement with the wall of such recess to clutch said two members together, and an abutment normally rotatable with said recessed member and in position to engage the adjacent end of said spring when said two members rotate in a direction to unwind said spring, said spring-end being bent axially outward so that it can recede to permit the passage of said abutment when said two members rotate in a direction to wind said spring.

8. In combination, two relatively rotatable members, one of said members having an axial cylindrical recess, a coil spring located in said recess and having an operative connection with the other of said rotatable members, said spring having contact with said recessed member so that when said members tend to rotate in a direction to unwind said spring it will expand into firm frictional engagement with the wall of such recess to clutch said two members together, and an abutment normally rotatable with said recessed member and in position to engage the adjacent end of said spring when said two members rotate in a direction to unwind said spring, said spring-end being bent so that it can recede to permit the passage of said abutment when said two members rotate in a direction to wind said spring.

9. In combination, two relatively rotatable members, one of said members having an axial cylindrical recess, a coil spring located in said recess and having an operative connection with the other of said rotatable members, said spring having contact with said recessed member so that when said members tend to rotate in a direction to unwind said spring it will expand into firm frictional engagement with the wall of such recess to clutch said two members together, and an abutment normally rotatable with said recessed member and in position to engage the adjacent end of said spring, said abutment and said spring-end being arranged to oppose relative rotation of said spring and said recessed member when they tend to rotate in a direction to unwind said spring and to permit relative rotation of said spring and said recessed member in such direction when a given torque between them is exceeded.

10. The combination set forth in claim 7 with the addition that said abutment and the spring-end it engages have engaging faces oblique to the spring axis.

11. In combination, two relatively rotatable members, one of said members having an axial cylindrical recess, a coil spring located in said recess and having an operative connection with the other of said rotatable members, said spring having contact with said recessed member so that when said members tend to rotate in a direction to unwind said spring it will expand into firm frictional engagement with the wall of such recess to clutch said two members together, and means acting near the end of said spring for normally opposing relative rotation of said spring and said recessed member in a direction to unwind said spring, said means acting to permit relative rotation of said spring and clutch member in such direction when a given torque between them is exceeded.

In witness whereof, I have hereunto set my hand at Indianapolis, Indiana, this 11th day of March, A. D. one thousand nine hundred and twenty-six.

WILLIAM CARLETON STARKEY.